Aug. 7, 1962

M. VOEGE 3,048,756

CONTROL CIRCUITS

Filed Oct. 5, 1959

INVENTOR
MAX VOEGE
BY *William R Jacox*

HIS ATTORNEY

United States Patent Office 3,048,756
Patented Aug. 7, 1962

3,048,756
CONTROL CIRCUITS
Max Voege, Dayton, Ohio, assignor to
Everett P. Larsh, Dayton, Ohio
Filed Oct. 5, 1959, Ser. No. 844,255
10 Claims. (Cl. 318—207)

This invention relates to control circuits. The invention relates more particularly to control circuits for single-phase electric motors. The invention relates still more particularly to control circuits for the reversing of single-phase motors.

A single-phase alternating current motor of the split phase type may be provided with a starting relay which includes a current coil in series with the main running winding and normally-open contacts in series with the auxiliary or starting winding. Thus, during starting conditions in the motor, the starting current through the coil is sufficient to cause the contacts to close. Then after the motor approaches operating speed, the current in the main winding or running winding decreases to such a value that the relay contacts open. Such opening of the contacts opens the circuit through the auxiliary or starting winding and the motor continues to operate on the main winding only.

Such a single-phase motor can ordinarily be instantly reversed by reversing the two lines leading from the main winding to the source of electrical energy. This reversal of lines generally causes a surge in the current flow through the main winding which causes closing of the contacts on the current relay. In such event the rotor of the motor promptly reverses in direction of rotation. Current which is sufficient to keep the relay energized continues in the main winding until the rotor approaches running speed in the said opposite direction of rotation.

The control apparatus described above usually serves to satisfactorily reverse such a single-phase motor. However, such control apparatus is inadequate for dependable reversing operation of a single-phase motor. If the flow of alternating current should be changing polarity and passing through zero value at the instant that reversal of the connections to the main winding occurs, no disturbance in the current flow would be caused and there would not be a current surge in the main winding. Therefore, the current relay would not operate to energize the auxiliary winding, and the motor would continue to run on its running winding only. Thus, the direction of rotation of the rotor would not be reversed.

Therefore, an object of this invention is to provide dependable automatic control means for reversal of a single-phase alternating current motor.

Another object of this invention is to provide such control means which may be constructed and assembled at comparatively low cost.

Another object of this invention is to provide such control means in which operating elements thereof may be of a manually operable type or may be of a remotely controlled type.

Other objects and advantages reside in the construction of parts, the combination thereof, the method of manufacture, and the mode of operation, as will become more apparent from the following description.

Figure 1:
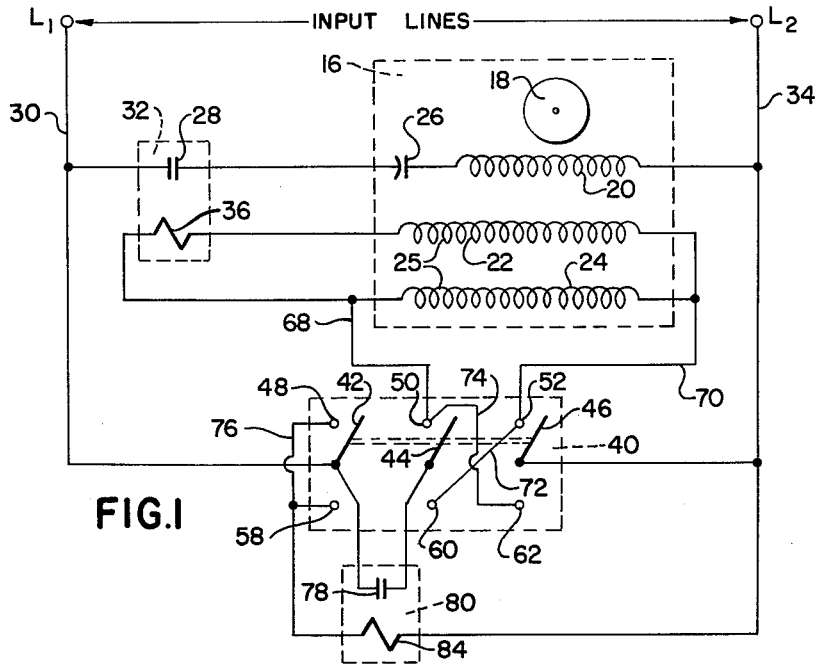
FIGURE 1 is a schematic diagram showing a control circuit of this invention connected to a single-phase motor in which a main winding of the motor has two portions which are connected in parallel.

Referring to the drawings in detail, FIGURE 1 shows a single-phase motor 16 which includes a rotor 18, an auxiliary or starting winding 20, and a main winding 25 having portions or branches 22 and 24. The auxiliary or starting winding 20 is shown as having a capacitor 26 connected in series therewith. Also in series with the capacitor 26 is a pair of normally-open contacts 28 which are connected to an input line 30. The input line 30 extends from a terminal L1. The contacts 28 are part of a current relay 32.

The auxiliary winding 20 is also connected to a power supply lead 34 which is joined to a terminal L2. The portion 22 of the main winding 25 is connected in series with an operating coil 36 of the current relay 32.

A three pole-double throw switch 40 is shown as being used to control energization and reversal of the main winding 25. The switch 40 has contact blades 42, 44, and 46 which are connected for operation together in a well known manner. The contact blades 42, 44, and 46 are in engagement with contact posts 48, 50, and 52, respectively when the switch 40 is closed in one direction. The blades 42, 44, and 46 are in engagement with contact posts 58, 60, and 62 respectively, when the switch 40 is closed in the opposite direction.

The line 30 is connected to the blade 42 and the line 34 is connected to the blade 46. A lead 68 connects the post 50 to one end of the main winding portion 24 and a lead 70 connects the post 52 to the other end of the main winding portion 24. A jumper 72 connects the post 52 to the post 60; a jumper 74 connects the post 50 to the post 62; a jumper 76 connects the post 48 to the post 58.

Connected between the blades 42 and 44 is a normally-open contact 78 of a relay 80. Connected between the post 58 and the line 34 is an operating coil 84 of the relay 80.

Operation

In order to start the motor 16, shown in FIGURE 1, the switch 40 may be closed in either direction, depending upon the desired direction of rotation of the rotor 18. First, assume that the switch 40 is closed in the upward position, as shown in FIGURE 1, so that the blades 42, 44, and 46 contact the posts 48, 50, and 52 respectively. When the switch 40 is so closed, current flows through the line 30, through the blade 42, and through the operating coil 84 to the line 34. This current flow through the coil 84 energizes the relay 80 and causes closing of the contacts 78. After the contacts 78 close, current flows from the line 30, through the contacts 78 and to the blade 44. Due to the fact that the blade 44 is in contact with the post 50, current flows through the lead 68 to the two portions 22 and 24 of the main winding 25 in parallel. Due to the fact that the rotor 18 is at a standstill, a surge of current flows through the main winding 25 and through the coil 36 of the relay 32.

This current flow is sufficient to energize the relay 32 and to cause closing of the contacts 28. Closing of the contacts 28 closes the circuit through the winding 20 so that the auxiliary winding or starting winding 20 is energized. With current flowing through the starting winding 20 and through the main winding 25, torque is created which causes the rotor 18 to begin rotation. As the rotor speed increases, the current flowing through the main winding 25 decreases until the value of the current flowing through the coil 36 is less than that necessary to maintain the contacts 28 in closed position. Hence, the contacts 28 open and the motor continues to run on the main winding 25 only.

For reversing the direction of rotation of the rotor 18, the switch 40 is opened and the blades 42, 44, and 46 are moved into contact with the posts 58, 60, and 62, respectively. Thus, a circuit is again established from the line 30 through the coil 84. If the switch 40 should be closed at an instant in which the alternating current flow is reversing direction and is at zero value, the coil 84 is not energized. The contacts 78 do not close until the instantaneous value of the alternating flow through the coil 84 reaches a considerable value. The relay 80 is adjusted so that the instantaneous value of voltage at which the contacts 78 close is sufficient to cause a surge current in the main winding 25. This surge of current in the main winding 25 assures closing of the contacts 28 of the relay 32.

Thus, when the contacts 78 are closed, a surge of current flows from the line 30 through the blade 44 to the post 60, through the jumper 72, through the lead 70 to the main winding 25. This surge of current flows through the coil 36 causing the contacts 28 to close so that the auxiliary winding 20 is energized.

Due to the fact that the connections to the main winding 25 are reversed with respect to the connections to the auxiliary winding 20, the current relationship through these windings 20 and 25 is changed in that the instantaneous relative directions of flow of current in the windings 20 and 25 are reversed. Thus, the direction of rotation of the rotor 18 is reversed. The contacts 28 do not open to deenergize the auxiliary winding 20 until the current through the main winding 25 has decreased to the "dropout" value of the coil 36 of the relay 32.

Due to the fact that the contacts 78 must be closed for energizing the main winding 25, reversal is always assured when the switch 40 is reversed. Thus, the control circuits of this invention make possible dependable reversing operation of a single-phase motor.

Figure 2:
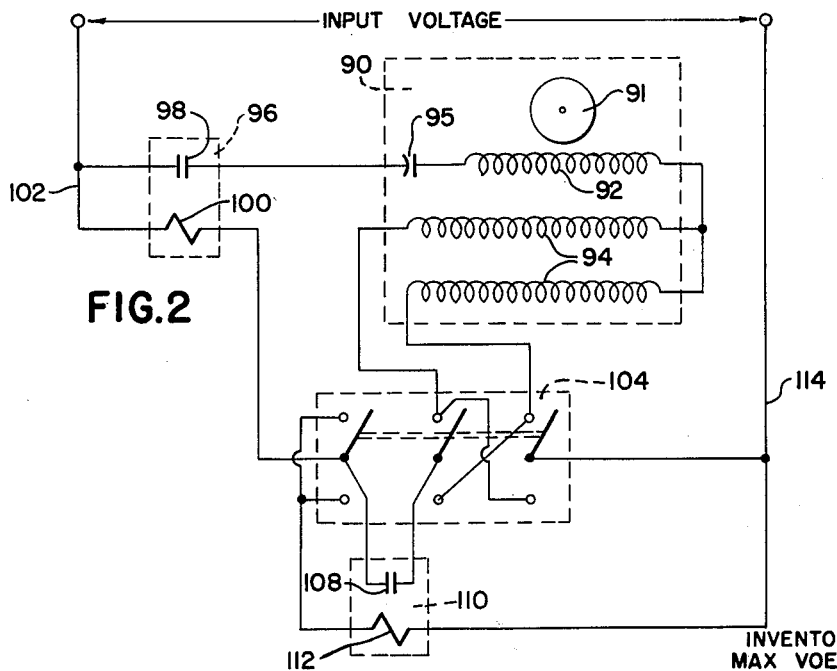
FIGURE 2 is a schematic diagram showing control circuits of this invention connected to a single-phase motor in which a main winding has two portions which are connected in series.

FIGURE 2 shows control circuits of this invention connected to a single-phase motor 90 having a rotor 91. The motor 90 also has a starting or auxiliary winding 92 and a main winding 94. A capacitor 95 is shown connected in series with the winding 92. The main winding 94 has two portions connected in series.

A current relay 96 has normally-open contacts 98 in series with the capacitor 95 and the starting winding 92. An operating coil 100 of the relay 96 is connected from a power supply line 102 to a three pole-double throw switch 104. Joining two blades of the switch 104 is a pair of normally-open contacts 108 of a relay 110. The relay 110 has an operating coil 112 connected from the power supply line 102 to a power supply line 114.

The circuits of FIGURE 2 operate in the same manner as those described with respect to FIGURE 1 in that energization of the coil 112 is necessary before energization of the main winding 94 of the motor 90 can occur. Thus, positive reversal of the rotor 91 is always assured when the switch 104 is reversed.

Figure 3:
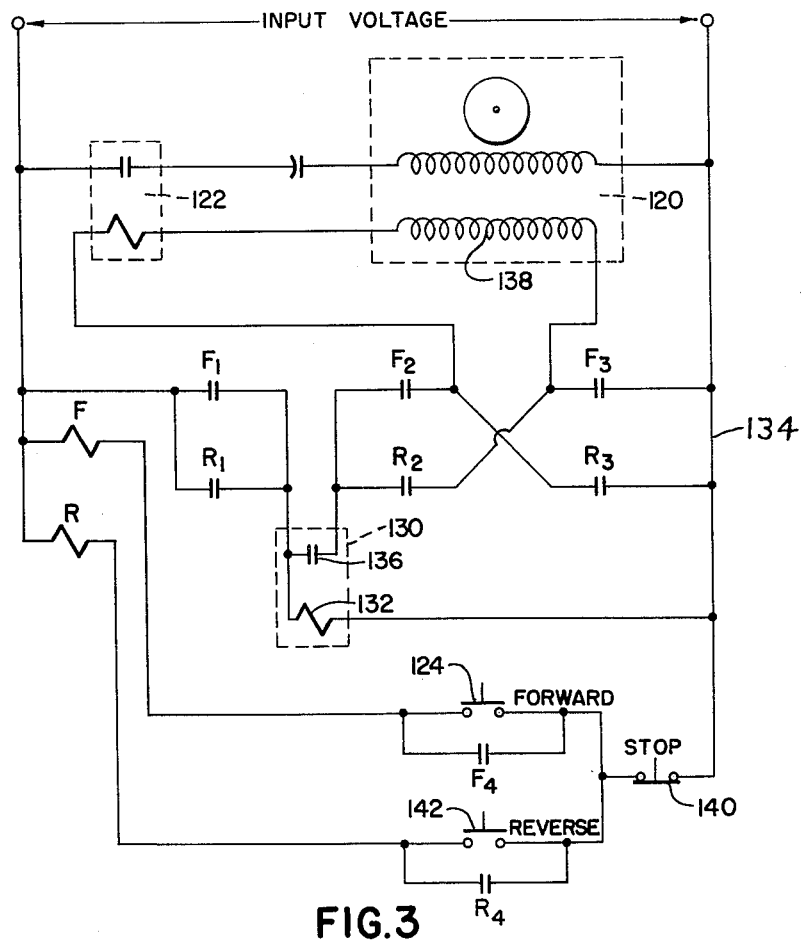
FIGURE 3 shows control circuits of this invention in which the control elements in the motor winding circuits are electromagnetically actuated.

FIGURE 3 shows a single-phase motor 120 to which is connected a current relay 122 which is similar to the relay 32, described above with respect to FIGURE 1. In FIGURE 3, the three pole-double throw switch of FIGURES 1 and 2 is replaced by electro-magnetic apparatus. For rotation of the motor 120 in a forward direction, a forward push button 124 is momentarily closed, so that a coil F is energized.

Energization of the coil F closes contactors F1, F2, and F3, and also closes interlock contacts F4 which are connected across the forward button 124. For reversal of rotation of the motor 120, a stop button 140 is depressed, deenergizing the main winding 138, then a reverse button 142 is depressed, causing closing of contactors R1, R2, and R3 and interlock contacts R4.

A relay 130 has an operating coil 132 connected from the contactors F1 and R1 to a power supply line 134. The relay 130 has normally-open contacts 136 which function to prevent energization of a main winding 138 of the motor 120 until the coil 132 is energized by a sufficient value of current therethrough, as described above with respect to the relay 80 of FIGURE 1. Thus, there is positive reversal of rotation of the motor 120 when desired. The forward and reverse contactors are mechanically interlocked so that they can not be closed at the same time.

As a modification to the push button circuits of FIGURE 3, the stop button may be omitted. In such modification, the Forward and Reverse switches are of the well known push button type and are used without interlocks connected thereacross. In such arrangement, the push button desired is manually maintained closed throughout the duration of operation in its indicated direction.

It is to be understood that a part or all of the control apparatus of this invention may be included within a single housing or may be housed within the housing of the motor controlled or may be exterior thereof. The devices used to carry out the invention may be of various types or kinds.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a single-phase motor provided with a main winding and a starting winding, a source of electrical energy, means connecting the main winding to the source of electrical energy, means responsive to a predetermined value of current flow through said main winding connecting said starting winding to the source of electrical energy, switch means for changing the current flow in said main winding with respect to said starting winding, and actuator means connected to said switch means and to the source of electrical energy, the actuator means being operable in response to a predetermined value of current flow therethrough from the source of electrical energy, and circuit closing means operable by the actuator means and in series with the switch means for connecting the main winding to the source of electrical energy.

2. In a single-phase motor provided with a main winding and a starting winding, a source of electrical energy, means connecting said windings in parallel relation to the source of energy, switching means responsive to a predetermined instantaneous value of the voltage of said source of energy controlling the instantaneous direction of flow of current through said main winding with respect to said starting winding, said switching means including means responsive to flow of current through said main winding controlling flow of current through said starting winding.

3. In combination with a single-phase motor having a main winding and an auxiliary winding, control means including a pair of input lines for connection to a source of electrical energy, there being a first line and a second line, the first line being connected to one end of the auxiliary winding, normally-open first switch means, the first switch means connecting the second line to the other end of said auxiliary winding, means responsive to a predetermined value of flow of current through the main winding for closing said first switch means, reversing switch means, said reversing switch means connecting one end of the main winding to the first line and the other end of said main winding to said second line, third switch means, said third switch means being in series with said reversing switch means, and actuator means for operation of the third switch means, the actuator means being responsive to instantaneous values of current flowing therethrough from the source of energy.

4. In combination with a single-phase alternating current motor having a main winding and an auxiliary winding, control means comprising power supply lines, means for connection of the power supply lines to the main winding, reversal means for reversal of the connections from the power supply lines to one of the windings, means responsive to instantaneous voltage values across the power supply lines connecting said reversal means to the source of electrical energy for controlling energization of said reversal means, and means responsive to a predetermined value of current flow through the main winding connecting the auxiliary winding to the power supply lines for energization of the auxiliary winding.

5. Control apparatus for a single-phase alternating current motor having a main winding and an auxiliary winding comprising a source of alternating current energy, reversible connection means for connecting the main winding to the source of alternating current energy, connector means for connecting said auxiliary winding to the source of alternating current energy, switch means in series with said reversible connection means and operably responsive to a predetermined instantaneous voltage value of said source of alternating current energy for energization of the main winding, and means operably connected to said connector means and responsive to a predetermined value of current flow through the main winding for operation of the connector means.

6. Apparatus for the control of a single-phase motor of the type provided with a main winding and an auxiliary winding comprising a source of alternating current energy, first switch means, the first switch means connecting the main winding to the source of energy, connector means connecting the auxiliary winding to the source of energy, second switch means, the second switch means being in series with the first switch means, means responsive to a predetermined instantaneous voltage value of the source of energy for operation of the second switch means, and means responsive to a predetermined value of current flow through the main winding for operation of the connector means.

7. Apparatus for controlling a single-phase motor having a main winding and an auxiliary winding comprising contact means connecting the auxiliary winding to the source of energy, reversing switch means connected to the main winding and to the source of energy, normally-open connector means in series with said switch means, control means for said connector means, said control means being connected to said source of energy and responsive to a predetermined instantaneous voltage value thereof for closing the connector means, and means responsive to a predetermined value of current flow through the main winding controlling said contact means.

8. Control apparatus for a single-phase motor having a main winding and an auxiliary winding comprising a source of electrical energy, switch means connecting the auxiliary winding to the source of electrical energy, means responsive to a predetermined value of current flow through predetermined main winding controlling the switch means, and switch means including means responsive to the instantaneous voltage values of the source of electrical energy controlling the direction of instantaneous flow of current in the main winding with respect to the direction of instantaneous flow of current in the auxiliary winding.

9. Control apparatus for a single-phase motor provided with a first winding and a second winding comprising a source of electrical energy, first switch means, said first switch means connecting said first winding to the source of electrical energy, second switch means, said second switch means connecting the second winding to the source of electrical energy, means responsive to a predetermined value of flow of current in the first winding for operating the switch means for connecting the second winding to the source of electrical energy, said first switch means including means for reversing the connections from the source of energy to the first winding, said first switch means also including circuit closing means responsive to a predetermined instantaneous current value flowing therethrough from the source of electrical energy.

10. Control circuitry for a single-phase motor provided with a main winding and an auxiliary winding comprising a source of electrical energy, first switch means, the first switch means connecting the auxiliary winding to the source of electrical energy, a three pole-double throw switch, the switch consisting of three pivotal blades and connector posts engageable thereby, there being a first, second, and third blade with two opposed connector posts for each blade with each blade being movable to contact either of two connector posts, the connector posts which are engageable by the first and second blades of the switch being connected to the main winding for reversal of the connections thereto, the first blade being connected to the source of electrical energy, the third blade also being connected to the source of electrical energy, second switch means, conductor means joining the second switch means to the third blade and to the second blade, operating means for said second switch means, said operating means for the second switch means being connected to the source of electrical energy and to the connector posts of the third blade, the operating means for the second switch means being responsive to a predetermined value of voltage of the source of electrical energy, and operating means for the first switch means, said operating means for the first switch means being responsive to a predetermined value of current flow in the main winding.

References Cited in the file of this patent
UNITED STATES PATENTS
2,804,582     Guth et al. _____ Aug. 27, 1957

UNITED STATES PATENT OFFICE
CERTIFICATE OF CORRECTION

Patent No. 3,048,756                              August 7, 1962

Max Voege

It is hereby certified that error appears in the above numbered patent requiring correction and that the said Letters Patent should read as corrected below.

Column 6, line 2, for "predetermined" read -- the --; line 4, for "the", first occurrence, read -- predetermined --.

Signed and sealed this 27th day of November 1962.

(SEAL)
Attest:
ESTON G. JOHNSON
Attesting Officer

DAVID L. LADD
Commissioner of Patents